United States Patent [19]
Yoshioka et al.

[11] Patent Number: 5,483,506
[45] Date of Patent: Jan. 9, 1996

[54] RADIO RECEIVER WITH PLAYBACK MEANS

[75] Inventors: Tsutomu Yoshioka; Kenichi Ozawa, both of Tokyo, Japan

[73] Assignee: Clarion Co., Ltd., Tokyo, Japan

[21] Appl. No.: 135,239

[22] Filed: Oct. 12, 1993

[30] Foreign Application Priority Data

Oct. 12, 1992 [JP] Japan .................... 4-298262

[51] Int. Cl.⁶ .................................................. H04H 9/00
[52] U.S. Cl. .................................................. 369/7; 381/34
[58] Field of Search ...................... 369/1, 7, 10, 6, 369/2, 30, 33; 381/80, 81, 29, 34, 35, 86; 395/2.2; 455/344, 345; 360/137

[56] References Cited

U.S. PATENT DOCUMENTS 4,805,217 2/1989 Morihiro et al. ............ 369/7 X
5,263,199 11/1993 Barnes et al. ............... 369/7 X

FOREIGN PATENT DOCUMENTS 62-107490 5/1987 Japan .
426983 6/1992 Japan .

*Primary Examiner*—Ali Neyzari
*Attorney, Agent, or Firm*—Koda and Androlia

[57] ABSTRACT

An audio device includes a playback device, such as a tape or CD player, and a radio. The audio device can be set to interrupt the playback device, upon receiving a signal, to output a special broadcast, such as a traffic information broadcast. When the playback device is interrupted during normal playback, playback is paused. Therefore, when the audio device switches back to the playback, the recording continues from the point at which playback was interrupted. When the playback device is interrupted during a special function, such as rewind or fast-foreword, the playback device is permitted to continue the special function to its completion while the broadcast is output.

23 Claims, 6 Drawing Sheets

RADIO RECEIVER WITH PLAYBACK MEANS

BACKGROUND OF THE INVENTION

This invention relates to audio units and specifically to audio units capable of switching between radio broadcast and recording playback modes.

With increasing traffic congestion, radio stations are broadcasting traffic information on dedicated frequency bands. For example, such broadcasts are transmitted in some areas on AM band at 1620 Khz. These broadcast transmissions are receivable by automobile radios, permitting drivers to learn about, and respond, to traffic problems while driving.

To avoid missing important traffic information, a driver is ordinarily forced to surrender the use of his car's cassette player or other audio source so that the driver can monitor a traffic information broadcast continuously. Alternatively, he can switch intermittently between a traffic information station and other audio sources.

To permit the driver to stay apprised of important traffic information while listening intermittently to other broadcasts or recordings, a car audio unit can be provided with a switch, known as an ISR switch. The driver presses the ISR switch once while listening to one audio source such as a recording or other radio station. This causes the audio unit to output a traffic information broadcast at a preset frequency The driver presses the ISR switch again to switch back to the original audio source.

Another system employing an ISR switch, is disclosed in Japanese laid-open patent publication SN62-107490. This system allows the driver to switch between playback of a recording and a traffic information broadcast. When the ISR switch is activated during playback of a recording, the system pauses the playback. When the driver presses the ISR switch again, the playback of the recording begins where it left off so that the driver misses none of the recording.

Outside Japan, extensive use has been made of systems that announce traffic information broadcasts using identification signals that are superimposed on FM broadcasts. One type of signal, called a DK signal, is transmitted by Traffic Information Identification (ARI) broadcasts. A second type, called a TA signal, is transmitted by Radio Data System broadcasts (RDS).

Audio units such as disclosed in Japanese laid-open Utility Model Publication SN4-26983, pause the currently-selected audio device when the DK signal is received. Audio from the traffic information broadcast is then output. For example, when a DK signal is received while a tape player is playing a tape, the tape playback mode is paused, halting the tape. After the traffic information broadcast is completed, the playback recommences where it left off.

When prior art devices such as disclosed in Japanese Laid-open Utility Model Publication SN62-107490 and Japanese Laid-open Utility Model Publication SN4-26983 receive a traffic information transmission, the tape is paused during normal playback mode. The playback mechanism is also paused when it is in non-playback mode such as fast-forward (FF-APC) and rewind (REW-APC) while the tape head is up (APC-mode). When the traffic information broadcast ceases, the recording must continue to perform the special playback mode from the point where the traffic information broadcast began.

OBJECTS AND SUMMARY OF THE INVENTION

It is an object of the present invention to provide an audio unit that overcomes the drawbacks or the prior art.

It is a another object of the present invention to provide a recording playback and broadcast receiver capable of performing special operating modes such as rewind and fast-forward, search, etc. while receiving broadcast transmissions.

It is still another object or the present invention to provide a recording playback and broadcast receiver which automatically switches between audio sources when a special request transmission is received.

Briefly stated, an audio device includes a playback device, such as a tape or CD player, and a radio. The audio device can be set to interrupt the playback device, upon receiving a signal, to output a special broadcast, such as a traffic information broadcast. When the playback device is interrupted during normal playback, playback is paused. Therefore, when the audio device switches back to the playback, the recording continues from the point at which playback was interrupted. When the playback device is interrupted during a special function, such as rewind or fast-forward, the playback device is permitted to continue the special function while the broadcast is output.

According to an embodiment of the present invention, there is disclosed, an electronic device, comprising: tuner means for receiving a first transmission and generating a first output signal from the transmission, playback means for scanning a recorded medium and generating a second output signal from the scanning, control means, connected to the tuner means and the playback means, for pausing a scanning of the recorded medium when the tuner means produces the first output signal, the control means including means for preparing for a scanning of a selected portion of the recorded medium and the control means including means for continuing a preparing for a scanning when the tuner means produces the first output signal.

According to another embodiment of the present invention, there is disclosed, an electronic device comprising: tuner means for receiving a transmissions and generating a first output signal from the transmission, playback means for scanning a recorded medium and generating a second output signal from the scanning, amplifier means for amplifying a selected one of the first output signal and the second output signal, the amplifier means including means for generating an audible output signal from the selected one, control means connected to the tuner means and the playback means, for selecting one of the first output signal and the second output signal for amplification and output of an audible signal, the control means including means for pausing a scanning of the recorded medium when the first output signal is selected for output, the control means including means for preparing for a scanning of a selected portion of the recorded medium and the control means including means for continuing a preparing for a scanning when the second output signal is selected for output. The above, and other objects, features and advantages of the present invention will become apparent from the following description read in conjunction with the accompanying drawings, in which like reference numerals designate the same elements.

According to still another embodiment of the present invention, there is disclosed, an electronic device, comprising: tuner means for receiving a first transmission and generating a first output signal from the transmission, playback means for scanning a recorded medium and generating a second output signal from the scanning, control means, connected to the tuner means and the playback means, for pausing a scanning of the recorded medium when the tuner means produces the first output signal, the control means including means for preparing for a scanning of a selected portion of the recorded medium, the control means having means for causing the tuner mean to produce the first output signal and the control means including means for continuing a preparing for a scanning when the control means causes the tuner means to produce the first output signal.

According to a further feature of the invention, there is provided an audio system comprising: a radio, a playback device for playing back a recorded medium, the playback device including at least one special function in addition to the playing back, an input device for inputting a desired one of the radio and the playback device, and for commanding the at least one special function, means for retaining information relating to the desired one, means for tuning the radio to a special broadcast frequency, the means for tuning being responsive to an event, a control circuit, the control circuit including means for selecting the desired one for providing an audio signal to a user, the control circuit including control means, effective beginning with the event, for tuning the radio to the special broadcast frequency, the control means being further effective for permitting completion of the special function that was begun before an occurrence of the event, means for restoring the audio system to a condition stored in the means for retaining, and the means for restoring further including means for beginning operation of the playback device at a condition existing at an end of the special function, if the special function is completed at an end of the event.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
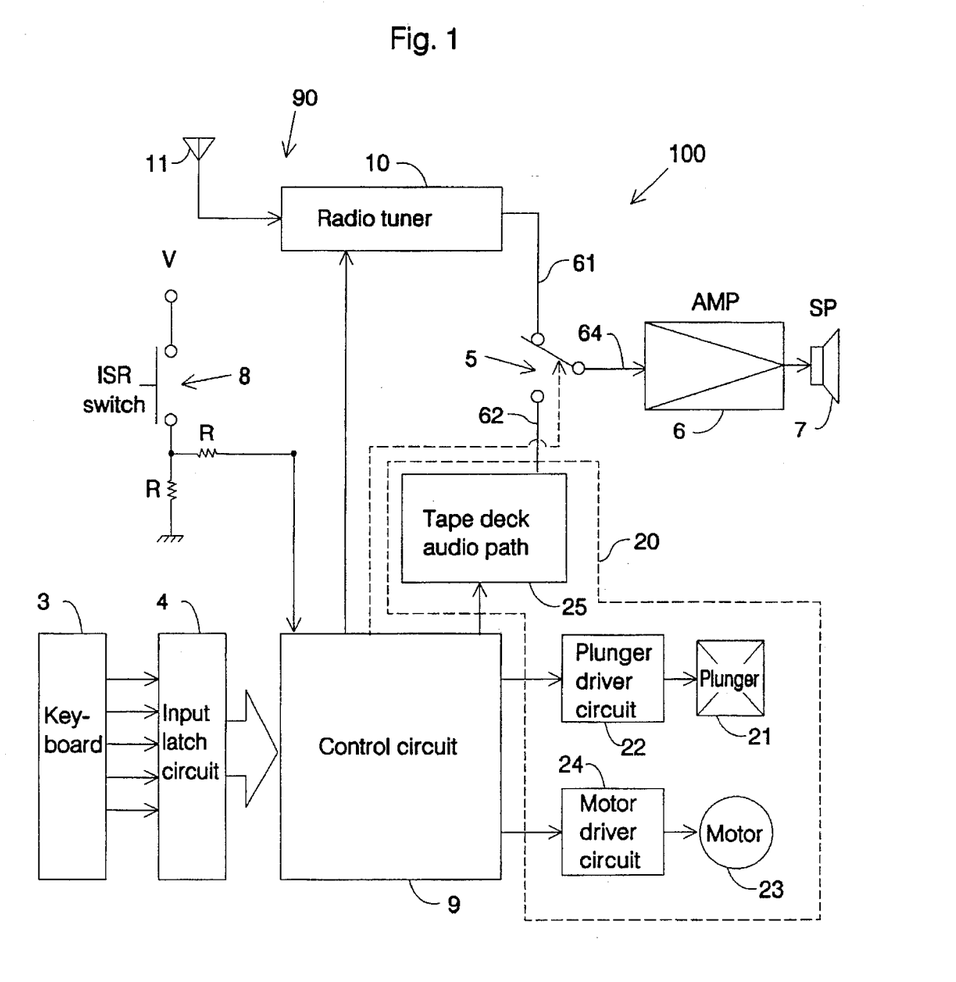
FIG. 1 is a block diagram of an audio unit according to a first embodiment of this invention.

Referring to FIG. 1, a block diagram of a first embodiment of an audio unit 100 is shown. Audio unit 100 has an amplifier 6 which amplifies either a first audio signal from a radio unit 90, or a second audio signal from a tape deck 20. A position of a source selection switch 5 determines which of the two audio signals is amplified and output to a speaker 7. Source selection switch 5 is controlled by a control circuit 9.

Radio unit 90 includes a radio tuner 10 and a reception antenna 11. Radio tuner 10 receives broadcast signals from amplitude modulation (AM) or frequency modulation (FM) transmissions. Radio tuner 10 outputs an audio signal through a radio output line 61 to one input of source selector switch 5. Tape deck 20 includes a tape deck audio path 25 which generates an audio signal through a tape output line 62 when tape deck 20 plays a tape (not shown). Tape output line 62 is connected to a second input or source selection switch 5.

An input device such as, for example, a keyboard 3, allows a user to select an operating mode for audio unit 100. An input latch circuit 4 stores a selected operating mode in its memory (not shown). An ISR switch 8 sends an ISR control signal to control circuit 9. The control signal from ISR switch 8 causes radio tuner 10 to adjust to a pre-set frequency. For example, the pre-set frequency could be 1620 kHz, the frequency of a traffic information broadcast station in certain areas. Control circuit 9, contains a random access memory circuit (RAM, not shown) that memorizes the operating mode that is current when ISR switch 8 is activated.

Tape deck 20 has a plunger driver circuit 22, controlled by an output signal from control circuit 9, which actuates a plunger 21. Plunger 21 moves a head and pinch roller (not shown) into contact with a magnetic tape (not shown). A motor driver circuit 24, controlled by an output signal from control circuit 9, drives and controls motor 23. Motor 23 feeds the magnetic tape.

Audio unit 100 has several operating modes including a radio reception mode and several tape modes. Among the tape modes is a normal playback mode and several special playback modes, including fast forward mode (FF-APC), rewind mode (REW-APC) and pause mode.

To set audio unit 100 in radio reception mode, keyboard 3 is used to select a desired reception frequency which is sent to input latch circuit 4. Input latch circuit 4 sends an operating mode signal to control circuit 9. Control circuit 9 sends a reception control signal to radio tuner 10, setting radio tuner 10 to the desired frequency. This causes radio tuner 10 to output an audio signal of a broadcast at the selected frequency to radio output line 61. Control circuit 9 sends a selection control signal to a source selection switch 5 causing it to connect radio output line 61 to amplifier 6. The audio signal from radio tuner 10 is then output through radio output line 61 and source selection switch 5 to amplifier 6. Amplifier 6 amplifies the signal, which is sent to speaker 7.

To set audio unit 100 in tape playback mode, an appropriate command is input to keyboard 3, which sends the command to input latch circuit 4. Input latch circuit 4 then sends a corresponding operating mode signal to control circuit 9. Control circuit 9 sends a selection control signal to source selection switch 5 to switch the audio source to tape output line 62. Control circuit 9 also sends appropriate control signals to plunger driver circuit 22, motor driver circuit 24 and tape deck audio path 25. These control signals cause plunger driver circuit 22 and motor driver circuit 24 to actuate plunger 21 and motor 23 perform the commanded function such as playing the tape. Playing the tape causes tape deck audio path 25 to generate an audio signal. The audio signal from tape deck 20 is then output through tape output line 62 to source selection switch 5 to an amplifier input 64 of amplifier 6. Amplifier 6 amplifies the signal and sends an amplified output to speaker 7.

Figure 2:
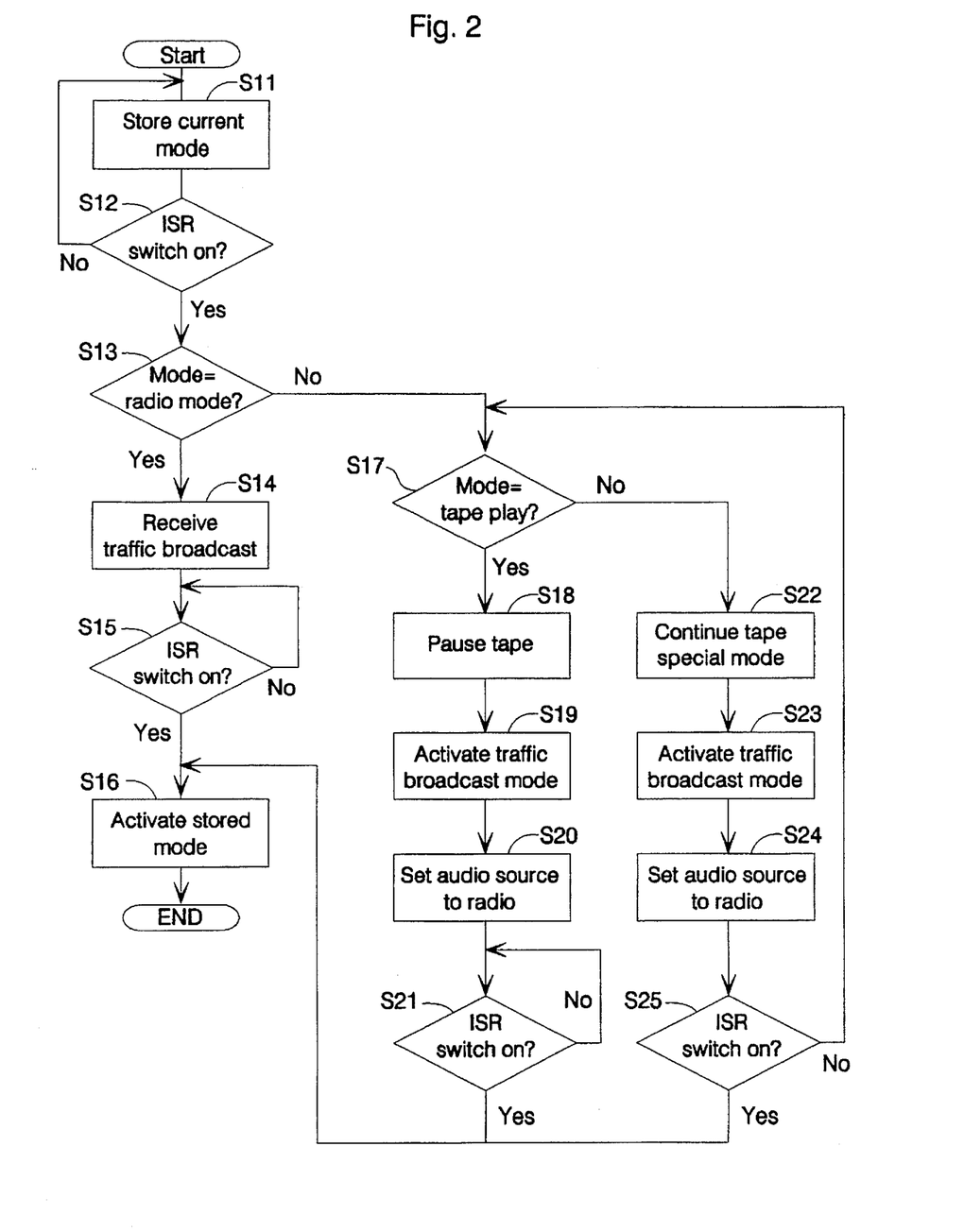
FIG. 2 is a flow-chart of the operation of the control circuit audio unit of FIG. 1.

Referring, now also to FIG. 2, the current operating mode is stored in RAM at step S11. Control then proceeds to step S12. Step S12 branches to step S13 if ISR switch 8 is on and loops back to S11 if ISR switch 8 is off. Step S13 branches to step S14 if the current operating mode is the radio reception mode. If the current operating is mode is not the radio reception mode, step S13 branches to step S17. At step S14, a reception control signal is sent to receive the traffic information broadcast. Control then proceeds to step S15. Step S15 loops back to itself until ISR switch 8 is activated again. When ISR switch 8 is reactivated, control proceeds to step S16 where the operating mode, stored in RAM at Step S11, is activated.

When the current operating mode is not the radio reception mode in step S13, control proceeds to step S17. Step S17 branches to step S18 if the current operating mode is the normal tape playback mode. In step S18, a control signal is sent to put tape deck 20 in a playback pause mode which stops the tape then playing. Control then proceeds to step S19, where a reception control signal is sent to receive the traffic information broadcast. Control then proceeds to step S20 where a selection control signal is sent to source selection switch 5. The selection control signal causes source selection switch 5 to connect radio output line 61 to amplifier input 64 causing the radio output to be amplified and output to speaker 7. Control proceeds to step S21. Step S21 branches to step S16 if ISR switch 8 is reactivated or loops back to itself if ISR switch 8 is off.

If the current operating mode at step S17 is not the normal tape playback mode, then control branches to step S22. For example, if the current operating mode is a special playback mode such as FF-APC or REW-APC, then control branches to step S22. At step S22, the current special playback mode is continued. Control then proceeds to step S23. At step S23, a reception control signal is sent to receive the traffic information broadcast. Control then proceeds to step S24, where a selection control signal is sent to source selection switch 5 to connect amplifier input 64 to radio output line 61. Control then proceeds to step S25 which branches to step S16 if ISR switch 8 is on, or to step S17 if ISR switch 8 is off.

According to the embodiment of the present invention described above, if the current mode at step S17 is not the normal tape playback mode, then the current special playback mode is continued. For example, if the special playback mode is FF-APC or REW-APC, then tape deck 20 continues to fast-forward or rewind the tape as control proceeds to step S23. At step S23, a reception control signal is sent to receive the traffic information broadcast. Control then proceeds to step S24. In step S24, a selection control signal is sent to source selection switch 5 to connect radio output line 61 to amplifier input 64 causing the radio output to be amplified and output to speaker 7. Since the special function is continued rather than paused at step S22, the tape continues the special function while audio unit 100 outputs the traffic information broadcast. Control then proceeds to step S25. Step S25 branches to step S16 if ISR switch 8 is on again. If ISR switch 8 is still off, control proceeds to step S17.

In step S17, the current operating mode is checked again. If the special playback mode has completed, the operating mode will have switched to normal tape playback mode. For example, if tape deck 20 has finished rewinding the tape, the normal playback mode is automatically invoked. If the normal playback mode is the current operating mode, step S17 branches to step S18 where tape deck 20 is put in pause mode. The traffic information broadcast continues to be output. Control proceeds through steps S19 and S20. These steps do not affect the operating mode of audio unit 100 since it is already outputting the traffic information broadcast. When operation reaches step S21, control loops until ISR switch 8 is reactivated.

If ISR switch 8 is activated when tape deck 20 is in a special playback mode, the traffic information broadcast is outputted and the function of the special playback mode continues. If the function of the special playback mode is completed before the traffic information broadcast is finished, the current operating mode switches to normal playback mode. The switch to normal playback mode is performed internally by tape deck 20 by a process external to the control flow of FIG. 2. The switch to normal playback is detected in step S17. Tape deck 20 is put in pause mode in step S18 and the traffic information broadcast continued in steps S19 and S20. Control loops at step S21 until ISR switch 8 is reactivated, indicating the user wishes to switch back to tape deck 20. Since the special playback mode was continued during the traffic information broadcast, the tape will begin playing at the point where it would have been upon completion of the special playback function.

Figure 3:
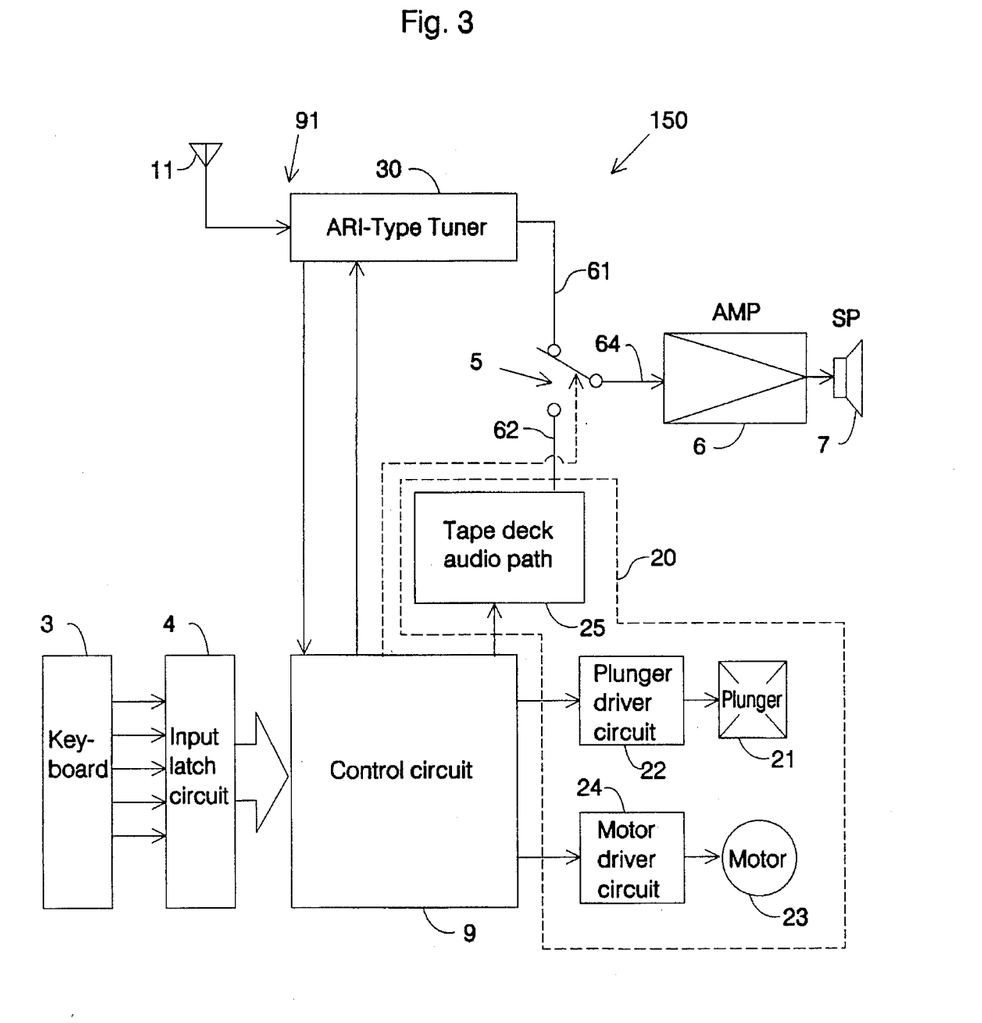
FIG. 3 is a block diagram of an audio unit according to a second embodiment of this invention.

Referring to FIGS. 1 and 3, a block diagram of a second embodiment of the invention, audio unit 150, is shown in FIG. 3. The only difference between FIGS. 1 and 3 is that the function of ISR switch 8 is replaced by an internal function of a special radio tuner, called an ARI-type tuner 30, described below. Elements that are identical to the first embodiment are given the same notation and the explanation of their composition and operation are as described with reference to FIG. 1.

In audio unit 150, radio tuner 10 of FIG. 1 is replaced by ARI-type tuner 30. ARI-type tuner 30 is a radio tuner equipped to receive identification signals, called DK signals. DK signals indicate the presence of a special type of traffic information broadcast, or ARI broadcasts, which are made at a specified frequency set internally in ARI-type tuner 30. When a DK signal is detected by ARI-type tuner 30, a control signal is sent to control circuit 9 to indicate the event. This function replaces ISR switch 8 of the first embodiment of FIG. 1.

Figure 4:
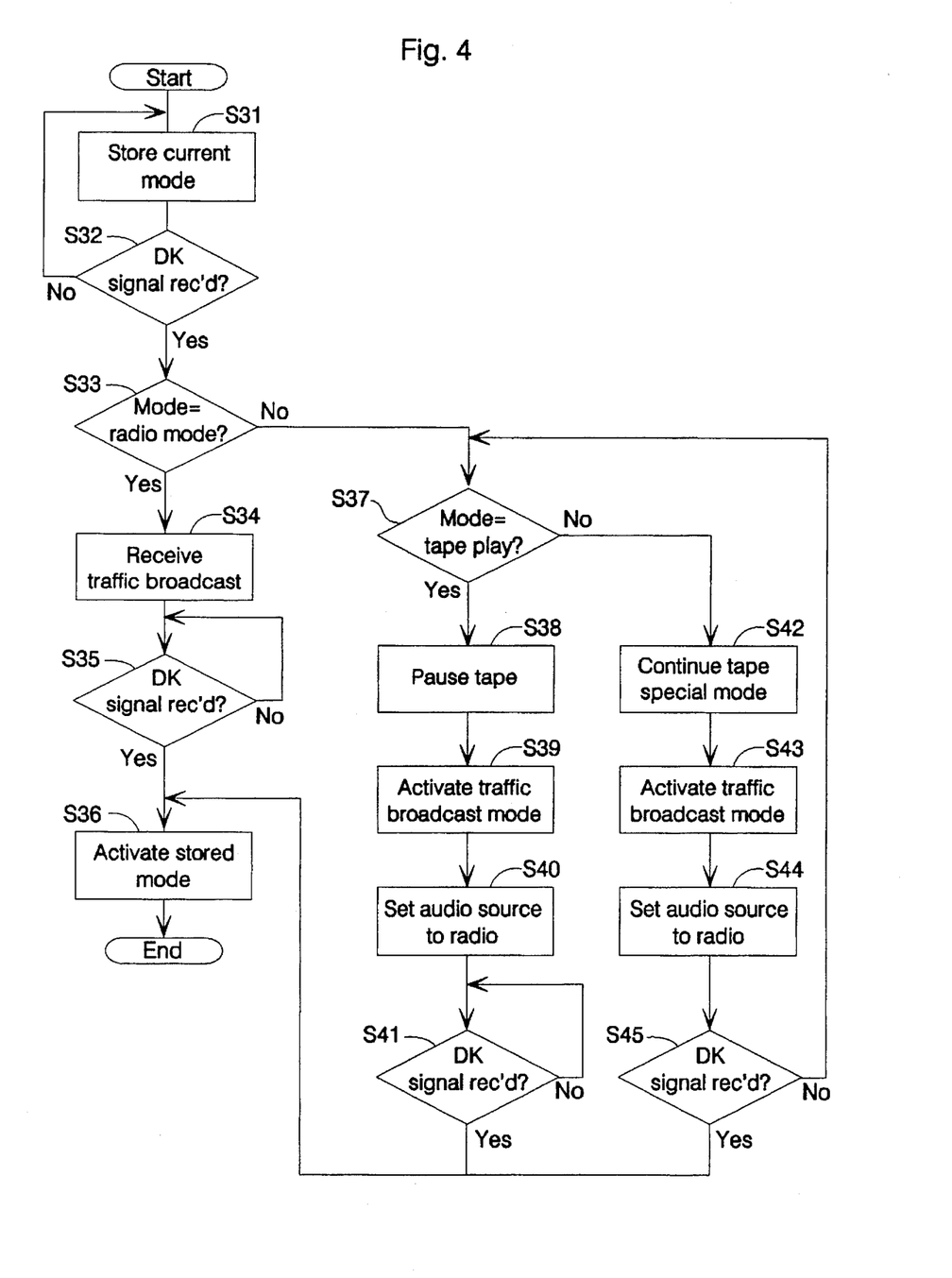
FIG. 4 is a flow-chart showing the operation of the control circuit for the audio unit of FIG. 3.

Referring to FIGS. 3 and 4, operation of control circuit 9 according to the second embodiment is as follows. The operation sequence is identical to that described with reference to FIG. 2, except that the radio reception mode is invoked in response to a DK signal from ARI-type tuner 30 instead of an ISR signal from ISR switch 8. Both the signal from ISR switch 8 and the DK signal are sent to control circuit 9 in the respective embodiments. FIG. 4 is a flowchart which shows the operation of the control circuit from the time a DK signal from an ARI broadcast is received.

The operation of the second embodiment is identical to that of the first except for the replacement of the ISR signal with the DK signal. According to the second embodiment, if a DK signal is detected when tape deck 20 is in a special playback mode, the traffic information broadcast is outputted and the function of the special playback mode is continued until completed. If the function of the special playback mode is completed before the traffic information broadcast is finished, the current operating mode switches to normal playback mode. The switch to normal playback mode is detected in step S37. Then tape deck 20 is put in pause mode in step S38 and the traffic information broadcast continued in steps S39 and S40. Then control loops at step S41 until a new DK signal is received. Thus, when a new DK signal is received indicating the traffic information broadcast is over, the tape begins to play at the point where it would have been after completion of the special playback function.

Figure 5:
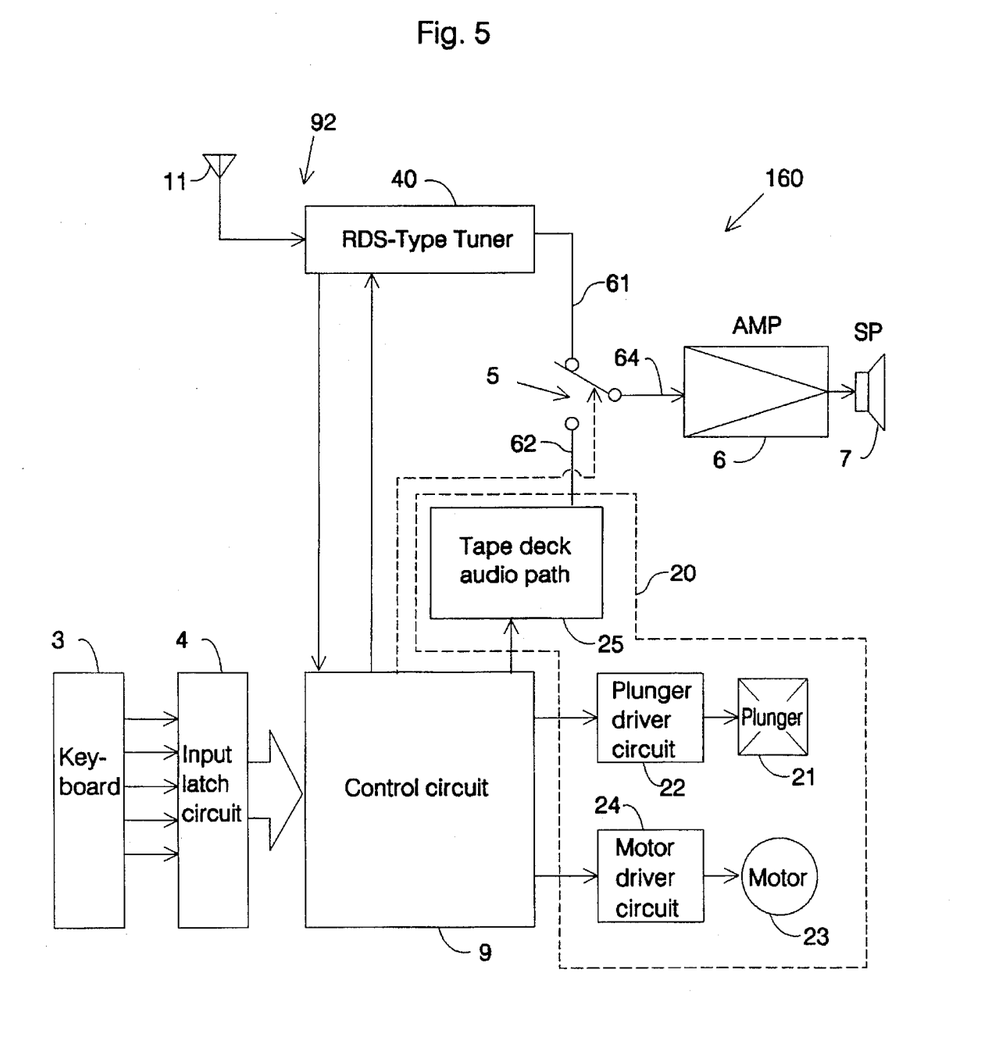
FIG. 5 is a block diagram of an audio unit according to a third embodiment 3 of this invention.

Referring to FIG. 5, a third embodiment of the invention includes an audio unit 160 that is identical to that of audio unit 150 of FIG. 3, except that ARI-type tuner 30 is replaced by an RDS-type tuner 40 equipped to receive identification signals, called TA signals from RDS broadcast stations. TA signals indicate the presence of a type of traffic information broadcast, or RDS broadcasts, which are made at a specified frequency set internally in the RDS-type tuner 40. When a TA signal is detected by RDS-type tuner 40, a control signal is sent to control circuit 9 to indicate the event. This function replaces ISR switch 8 of audio unit 100 of FIG. 1.

Figure 6:
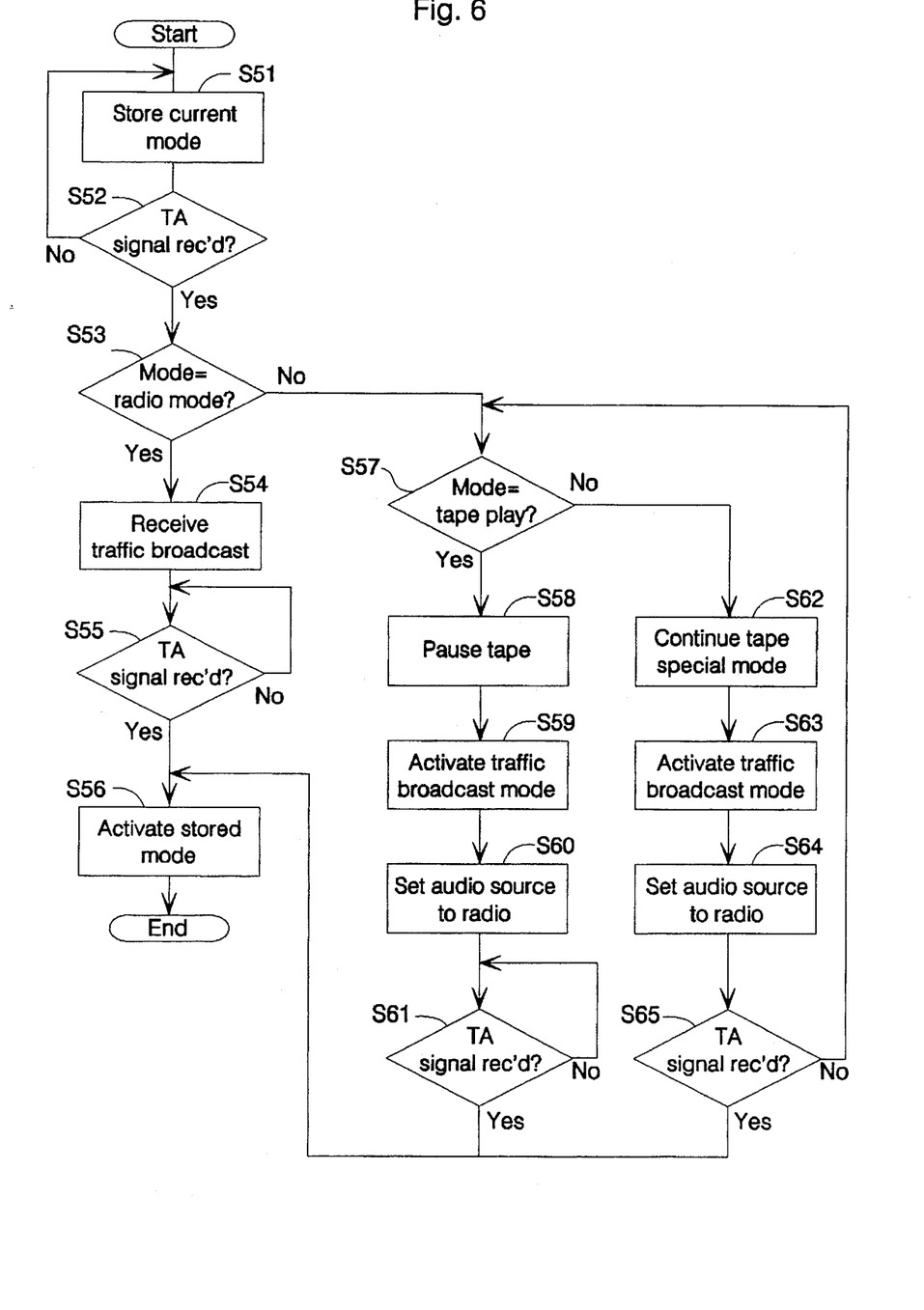
FIG. 6 is a flow-chart showing the operation of the control circuit of the audio unit of FIG. 5.

Referring now also to FIG. 6, operation of control circuit 9 according to the third embodiment of the invention is identical to that of the first embodiment of FIG. 2, except that the radio reception mode is invoked in response to a TA signal from an RDS-type tuner 40 instead of a signal from ISR switch 8 of FIG. 1. FIG. 6 is a flow-chart which shows the operation of the control circuit from the time a TA signal from an RIDS broadcast is received. The flow-chart of FIG. 6 is identical to that of FIG. 2 except that the TA signal plays the role of the ISR signal from ISR switch 8.

According to the third embodiment of the invention, if a TA signal is detected when tape deck 20 is in a special playback mode, the traffic information broadcast is outputted and the function of the special playback mode continues. If the function of the special playback mode is completed before the traffic information broadcast is finished, the current operating mode switches to normal playback mode. The switch to normal playback mode is detected in step S57. Then tape deck 20 is put in pause mode in step S58 and the traffic information broadcast continued in steps S59 and S60. Then control loops at step S61 until a new TA signal is received. Thus, when a new TA signal is received indicating the traffic information broadcast is over, the tape will play at the point where it would have been after completion of the special playback function.

In the above embodiments, FF-APC and REW-APC were given as examples of special playback modes. It is noted that the FF and REW modes could also be substituted for these in keeping with the spirit of the invention. Also, in the above embodiments the recording playback device was a tape deck 20. It is noted that any other player of a recorded medium could be substituted for tape deck 20 of the above embodiments. For example, a CD-player could be used. Ira a single-disc CD-player, the function occurring may be, for example, a track change, which the present invention would permit continuance of until completed. In a multiple-disc CD-player, the function may be, for example, a disc change, which the present invention would permit continuance of until completed.

With an audio unit as described above, it is possible to receive and output a pre-set broadcast frequency while simultaneously continuing the operation of special playback mode functions. When the pre-set command signal is detected again, the original special playback mode is reactivated. Thus this invention has the effect of being able to continue playback of a recording having made use of the time during which the traffic report was output to continue the special playback/function. In this way, once normal playback resumes, the recording will be output from the point in the medium toward which the special command was proceeding when the audio device switched to the traffic information broadcast. It is anticipated that, instead of a special command to start, and a second special command to stop, the receipt of traffic information, a system may simply continue the special command during the entire traffic information broadcast. Such a system should be considered to fall within the spirit and scope of the present invention.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. An electronic device, comprising:

tuner means for receiving a first transmission and generating a first output signal from said transmission;

playback means for scanning a recorded medium and generating a second output signal from said scanning;

control means connected to said tuner means and said playback means, for pausing a scanning of said recorded medium when said tuner means produces said first output signal, said control means including means for preparing for a further scanning of a selected portion of said recorded medium, said preparing being continued under a predetermined state of said playback means.

2. Apparatus as in claim 1, wherein:

said tuner means includes means for causing said tuner means to produce said first output signal;

said means for causing is responsive to a second transmission;

said second transmission is prior to said first transmission: and said second transmission announces said first transmission.

3. An electronic device, comprising:

tuner means for receiving a transmission and generating a first output signal from said transmission;

playback means for scanning a recorded medium and generating a second output signal from said scanning;

amplifier means for generating an audible output signal from a selected one of said first output signal and said second output signal;

control means, connected to said tuner means and said playback means, for selecting one of said first output signal and said second output signal for amplification and output of an audible signal, said control means being operated for pausing a scanning of said recorded medium when said first output signal is selected for output, while for preparing for a further scanning of a selected portion of said recorded medium, said control means further being arranged for continuing said preparing for said further scanning under a predetermined state of said playback means.

4. Apparatus as in claim 2, wherein:

said means for causing is responsive to a second transmission:

said second transmission is prior to said first transmission; and said second transmission announces said first transmission.

5. Apparatus as in claim 4, wherein said second transmission is a Traffic Announcement signal superimposed on a frequency modulation broadcast.

6. Apparatus as in claim 4, wherein said first transmission includes a traffic information broadcast.

7. Apparatus as in claim 4, wherein:

said playback means includes one of means for playing a tape recording and means for playing a compact disk recording; and said tuner means is a radio tuner for receiving broadcast transmissions including broadcast transmissions in the amplitude modulation and frequency modulation bands.

8. Apparatus as in claim 2, wherein said second transmission is a Traffic Announcement (TA) signal.

9. Apparatus as in claim 2, wherein said second transmission is an Automotive Radio Information signal.

10. Apparatus as in claim 2, wherein said first transmission includes a traffic information broadcast.

11. Apparatus as in claim 2, wherein:

said playback means includes one of means for playing a tape recording and means for playing a compact disk recording; and said tuner means is a radio tuner for receiving broadcast transmissions including broadcast transmissions in the amplitude modulation and frequency modulation bands.

12. Apparatus as in claim 4, wherein said second transmission is an identification signal from an Automotive Radio Information broadcast station.

13. An electronic device, comprising:

tuner means for receiving a first transmission and generating a first output signal from said transmission;

playback means for scanning a recorded medium and generating a second output signal from said scanning;

control means, connected to said tuner means and said playback means, for pausing a scanning of said recorded medium when said tuner means produces said first output signal;

said control means including means for preparing for a scanning of a selected portion of said recorded medium;

said control means having means for causing said tuner means to produce said first output signal; and said control means including means for continuing a preparing for a scanning when said control means causes said tuner means to produce said first output signal under a predetermined state of said playback means.

14. Apparatus as in claim 14, wherein:

said means for causing is responsive to a second transmission;

said second transmission is prior to said first transmission; and said second transmission announces said first transmission.

15. Apparatus as in claim 14, wherein said second transmission is a Traffic Announcement (TA) signal superimposed on a frequency modulation broadcast.

16. Apparatus as in claim 14, wherein said second transmission is an identification signal from an Automotive Radio Information broadcast station.

17. Apparatus as in claim 14, wherein said first transmission includes a traffic information broadcast.

18. Apparatus as in claim 14, wherein:

said playback means includes one of means for playing a tape recording and means for playing a compact disk recording; and said tuner means is a radio tuner for receiving broadcast transmissions including broadcast transmissions in the amplitude modulation and frequency modulation bands.

19. An audio system comprising:

a radio:

a playback device for playing back a recorded medium;

said playback device including at least one special function in addition to said playing back;

an input device for inputting a desired one of said radio and said playback device, and for commanding said at least one special function;

means for retaining information relating to said desired one;

means for tuning said radio to a special broadcast frequency;

said means for tuning being responsive to an event;

a control circuit:

said control circuit including means for selecting said desired one for providing an audio signal to a user;

said control circuit including control means, effective beginning with said event, for tuning said radio to said special broadcast frequency;

said control means being further effective for permitting completion of said special function that was begun before an occurrence of said event:

means for restoring said audio system to a condition stored in said means for retaining; and said means for restoring further including means for beginning operation of said playback device at a condition existing at an end of said special function, if said special function is completed at an end of said event.

20. Apparatus according to claim 20, wherein said event includes first and second manual actuation of a switch.

21. Apparatus according to claim 20, wherein said event includes first and second occurrences of a radio signal.

22. Apparatus according to claim 20, wherein said event includes the occurrence of one of a traffic announcement and an automotive radio information signal.

23. Apparatus according to claim 20, wherein:

said playback device includes a tape player; and said special function includes at least one of fast forward and fast reverse.

* * * * *